US010505198B2

(12) United States Patent
Heo et al.

(10) Patent No.: US 10,505,198 B2
(45) Date of Patent: Dec. 10, 2019

(54) METHOD FOR MANUFACTURING FUEL ELECTRODE SUPPORT FOR SOLID OXIDE FUEL CELL AND FUEL ELECTRODE SUPPORT FOR SOLID OXIDE FUEL CELL

(71) Applicant: LG CHEM, LTD., Seoul (KR)

(72) Inventors: Yeonhyuk Heo, Daejeon (KR); Kwangwook Choi, Daejeon (KR); Jongjin Lee, Daejeon (KR); Takkeun Oh, Daejeon (KR); Bu Won Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 543 days.

(21) Appl. No.: 14/911,020

(22) PCT Filed: Sep. 26, 2014

(86) PCT No.: PCT/KR2014/009062
§ 371 (c)(1),
(2) Date: Feb. 8, 2016

(87) PCT Pub. No.: WO2015/046977
PCT Pub. Date: Apr. 2, 2015

(65) Prior Publication Data
US 2016/0197355 A1    Jul. 7, 2016

(30) Foreign Application Priority Data
Sep. 27, 2013   (KR) .................. 10-2013-0115512

(51) Int. Cl.
*H01M 4/04*    (2006.01)
*H01M 4/88*    (2006.01)
(Continued)

(52) U.S. Cl.
CPC .......... *H01M 4/8817* (2013.01); *B24C 11/00* (2013.01); *H01M 8/1226* (2013.01); *H01M 4/04* (2013.01);
(Continued)

(58) Field of Classification Search
CPC ... H01M 4/8817; H01M 4/8878; H01M 4/803
See application file for complete search history.

(56) References Cited

U.S. PATENT DOCUMENTS

| | | | | |
|---|---|---|---|---|
| 2,274,172 A | * | 2/1942 | Swisher | .................. B24C 1/04 451/82 |
| 5,612,110 A | * | 3/1997 | Watremez | ............. F16D 65/123 188/251 R |

(Continued)

FOREIGN PATENT DOCUMENTS

| | | |
|---|---|---|
| CA | 2832329 A1 | 11/2012 |
| JP | H09-245810 A | 9/1997 |

(Continued)

OTHER PUBLICATIONS

Office Action for Korean Patent Application No. 10-2014-0129594 dated Apr. 21, 2016.
(Continued)

*Primary Examiner* — Jeremiah R Smith

(57) ABSTRACT

The present application relates to a method of manufacturing an anode supporter of a solid oxide fuel cell and an anode supporter of a solid oxide fuel cell, and may improve performance and durability of the fuel cell by improving an interfacial property between the anode supporter and an electrolyte.

8 Claims, 2 Drawing Sheets

(51) Int. Cl.
*H01M 8/1226* (2016.01)
*B24C 11/00* (2006.01)
*H01M 8/124* (2016.01)
*H01M 4/80* (2006.01)
*H01M 4/86* (2006.01)

(52) U.S. Cl.
CPC .......... *H01M 4/0435* (2013.01); *H01M 4/803* (2013.01); *H01M 4/8875* (2013.01); *H01M 4/8878* (2013.01); *H01M 2004/8684* (2013.01); *H01M 2008/1293* (2013.01)

(56) References Cited

U.S. PATENT DOCUMENTS

| | | | | |
|---|---|---|---|---|
| 6,792,677 | B1* | 9/2004 | Oishi | H01L 21/563 156/153 |
| 2002/0155335 | A1* | 10/2002 | Kearl | H01M 8/2432 429/465 |
| 2004/0058228 | A1* | 3/2004 | Shibata | H01M 4/861 429/480 |
| 2006/0040168 | A1* | 2/2006 | Sridhar | B82Y 30/00 429/482 |
| 2007/0148521 | A1 | 6/2007 | Ukai et al. | |
| 2008/0280189 | A1 | 11/2008 | Kesler et al. | |
| 2009/0011307 | A1* | 1/2009 | Lee | B82Y 30/00 429/528 |
| 2010/0143820 | A1* | 6/2010 | Luo | H01M 4/9016 429/482 |
| 2011/0014539 | A1 | 1/2011 | Ryu et al. | |
| 2012/0052347 | A1* | 3/2012 | Wilson | H01M 8/0232 429/72 |
| 2012/0178016 | A1* | 7/2012 | Park | C01G 29/006 429/482 |
| 2014/0051009 | A1* | 2/2014 | Ohno | H01M 8/04201 429/482 |

FOREIGN PATENT DOCUMENTS

| | | |
|---|---|---|
| JP | 2005-322547 A | 11/2005 |
| JP | 2007-265920 A | 10/2007 |
| JP | 2007-287397 A | 11/2007 |
| JP | 2010-218759 A | 9/2010 |
| JP | 2012-204149 A | 10/2012 |
| KR | 10-0972529 B1 | 7/2010 |
| KR | 10-2010-0134347 A | 12/2010 |
| KR | 10-2011-0006885 A | 1/2011 |
| KR | 10-2012-0075232 A | 7/2012 |
| WO | WO 2007/048253 A1 | 5/2007 |

OTHER PUBLICATIONS

Extended European Search Report for EP Application No. 14847764.9, dated Jan. 2, 2017.
Baba, Nor Bahiyah, "YSZ Reinforced NI-P Composite by Electroless Nickel Co-Deposition", Ning Hu (Ed.) Composites and Their Properties, Aug. 22, 2012, pp. 457-482.
Written Opinion of the International Searching Authority for International Application No. PCT/KR2014/009062 filed Sep. 26, 2014.
International Search Report for International Application No. PCT/KR2014/009062 filed Sep. 26, 2014.

* cited by examiner

[FIG. 1]
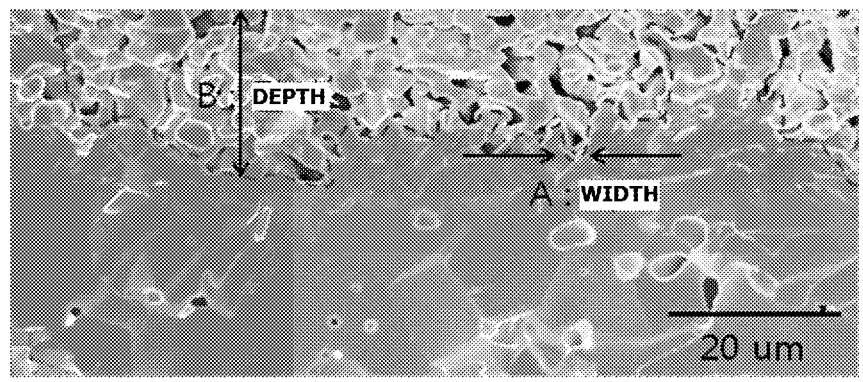
[FIG. 2]
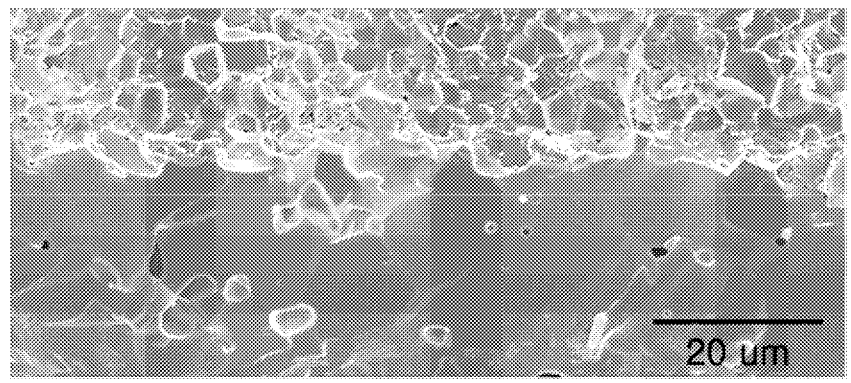

[FIG. 3]
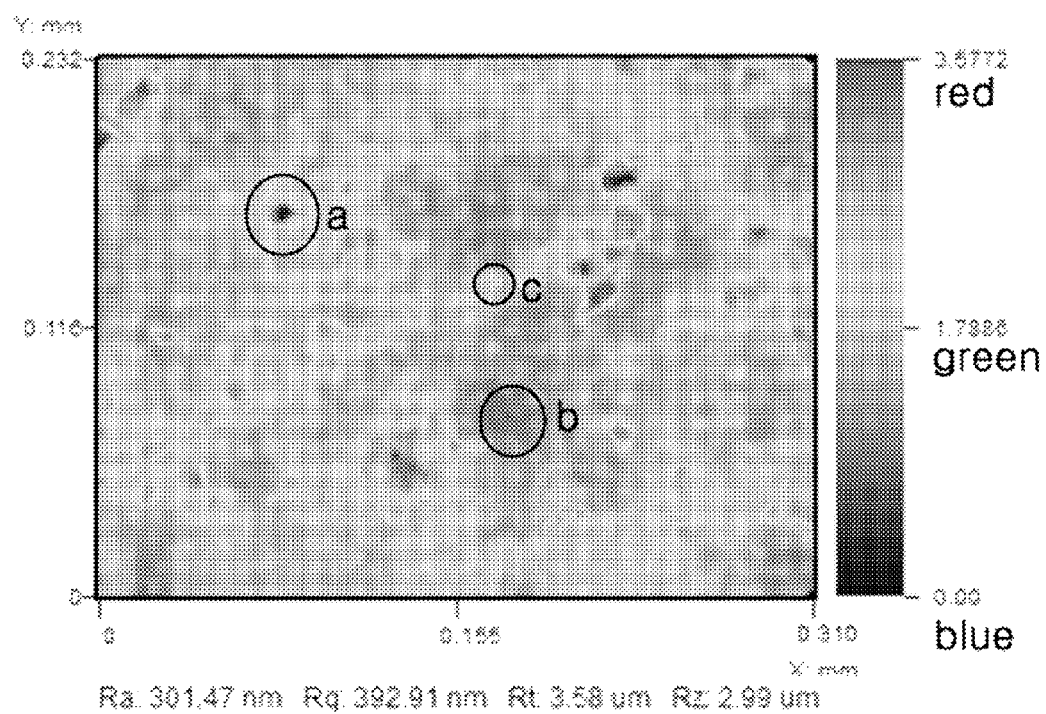

METHOD FOR MANUFACTURING FUEL ELECTRODE SUPPORT FOR SOLID OXIDE FUEL CELL AND FUEL ELECTRODE SUPPORT FOR SOLID OXIDE FUEL CELL

This application is a U.S. National Stage of International Patent Application No. PCT/KR2014/009062 filed Sep. 27, 2013, which claims priority to and the benefit of Korean Patent Application No. 10-2013-0115512 filed in the Korean Intellectual Property Office on Sep. 27, 2013, the entire contents of which are incorporated herein by reference.

TECHNICAL FIELD

This application claims priority to and the benefit of Korean Patent Application No. 10-2013-0115512 filed in the Korean Intellectual Property Office on Sep. 27, 2013, the entire contents of which are incorporated herein by reference.

The present application relates to a method of manufacturing an anode supporter of a solid oxide fuel cell, and an anode supporter of a solid oxide fuel cell.

BACKGROUND ART

A fuel cell is an apparatus directly converting chemical energy of fuel and air into electricity and heat by an electrochemical reaction. The fuel cell, unlike an electric power generation technology in the related art adopting fuel combustion, steam generation, turbine driving, and generator driving processes, does not have a combustion process or a driving apparatus, and thus the fuel cell is a novel concept of electric power generation technology having high efficiency and not causing an environmental problem. This fuel cell has merits in that since air pollution materials such as Sox and NOx are hardly emitted and carbon dioxide is less produced, pollution-free electric power generation, low noise, and no vibration are attained.

Examples of the fuel cell include various kinds such as a phosphoric acid fuel cell (PAFC), an alkaline fuel cell (AFC), a polymer electrolyte fuel cell (PEMFC), a direct methanol fuel cell (DMFC), and a solid oxide fuel cell (SOFC), and among the fuel cells, the solid oxide fuel cell (SOFC) has high electric power generation efficiency because of a low overvoltage and a small irreversible loss based on low activation polarization. Further, since in addition to hydrogen, carbon or hydrocarbon-based fuel may be used, a width of fuel selection is wide, and since a reaction speed in an electrode is high, an expensive precious metal as an electrode catalyst is not required. Moreover, heat emitted to be concomitant with electric power generation has a very high temperature, and thus a utility value thereof is high. Heat generated in the solid oxide fuel cell may be used to reform fuel, and may be used as an energy source for industries or cooling in steam supply and power generation.

The solid oxide fuel cell may be classified into an anode supporter type, a cathode supporter type, an electrolyte supporter type, and the like according to a relative thickness of a supporter. The anode supporter type SOFC has a merit in that since electric conductivity of an anode is high, even though the anode supporter type SOFC becomes a thick support type, current resistance is not large.

Therefore, there is a demand for developing a technology for improving performance of an anode supporter type solid oxide fuel cell and durability of the fuel cell.

DETAILED DESCRIPTION OF THE INVENTION

Technical Problem

The problem to be solved by the present application is to provide an anode supporter where an interfacial property between the anode supporter and an electrolyte of a solid oxide fuel cell is improved to increase a substantial area in which a hydrogen oxidation reaction occurs at an anode and thus improve performance of the fuel cell and a delamination phenomenon of an interface is prevented to improve durability of the cell, and a method of manufacturing the same.

Further, another problem to be solved by the present application is to provide a solid oxide fuel cell including the aforementioned anode supporter, and a method of manufacturing the same.

The problems to be solved by the present application are not limited to the aforementioned technical problems, and other unmentioned technical problems may be clearly understood by a person with skill in the art from the following description.

Technical Solution

An exemplary embodiment of the present application provides a method of manufacturing an anode supporter of a solid oxide fuel cell, the method including: surface-treating at least one surface of the anode supporter including a metal and an inorganic oxide having oxygen ion conductivity by using a blast method.

Another exemplary embodiment of the present application provides a method of manufacturing a solid oxide fuel cell, the method including: preparing an anode supporter by using the aforementioned manufacturing method; and applying an inorganic oxide having ion conductivity on a surface-treated surface of the anode supporter to form an electrolyte.

Yet another exemplary embodiment of the present application provides an anode supporter of a solid oxide fuel cell manufactured by the aforementioned manufacturing method.

Still another exemplary embodiment of the present application provides an anode supporter of a solid oxide fuel cell including: a metal, and an inorganic oxide having oxygen ion conductivity, in which a concavo-convex unit having a width of 0.5 micrometers or more and 10 micrometers or less is provided on at least one surface of the anode supporter, and a height difference between a highest point and a lowest point of the concavo-convex unit is 0.1% or more and 50% or less of a total thickness of the anode supporter.

Still yet another exemplary embodiment of the present application provides a method of manufacturing a solid oxide fuel cell, the method including: preparing the anode supporter; and applying an inorganic oxide having ion conductivity on a surface-treated surface of the anode supporter to form an electrolyte.

A further exemplary embodiment of the present application provides a solid oxide fuel cell including: the anode supporter; a cathode positioned to face the anode supporter; and an electrolyte positioned between the anode supporter and the cathode.

Advantageous Effects

In an anode supporter of a solid oxide fuel cell according to an exemplary embodiment of the present application, it is possible to improve performance of the fuel cell by improving an interfacial property between electrolytes. Further, there are merits in that it is possible to prevent a delamination phenomenon of an interface between the anode supporter and the electrolyte and thus slow down a reduction speed of efficiency of the fuel cell and improve durability of the cell.

BRIEF DESCRIPTION OF DRAWINGS

FIG. 1 illustrates a graph obtained by measuring a cross-sectional view of a form where an electrolyte is applied on an anode supporter of Example 1 by an electron microscope (SEM).

FIG. 2 illustrates a graph obtained by measuring a cross-sectional view of a form where an electrolyte is applied on an anode supporter of Comparative Example 1 by an electron microscope (SEM).

FIG. 3 illustrates data obtained by measuring a surface roughness of the anode supporter of Example 1 by using an optical profiler.

BEST MODE

Advantages and characteristics of the present application, and methods for achieving them will be apparent by referring to embodiments described below in detail in addition to the accompanying drawings. However, the present application is not limited to the exemplary embodiments to be disclosed below but may be implemented in various different forms. Therefore, the exemplary embodiments introduced herein are provided to make disclosed contents of the present application thorough and complete and sufficiently transfer the spirit of the present invention to those skilled in the art, and the present application is just defined by the scope of the appended claims. The sizes and the relative sizes of constituent elements shown in the drawings may be exaggerated for clarity of description.

Unless otherwise defined, all terms used in the present specification, including technical or scientific terms, have the same meanings as those commonly understood by those with ordinary skill in the technical field to which the present application belongs. Further, terms defined in a generally used dictionary are not interpreted to have ideal or excessively formal meanings unless clearly defined in the present invention.

Hereinafter, the present application will be described in detail.

An exemplary embodiment of the present application provides a method of manufacturing an anode supporter of a solid oxide fuel cell, the method including: surface-treating at least one surface of the anode supporter including a metal and an inorganic oxide having an oxygen ion conductivity by using a blast method.

At least one surface may mean a surface coming into contact with an electrolyte, and may be a portion or the entirety of the surface.

The surface-treated surface may be a portion coming into contact with the electrolyte.

The anode supporter serves to electrochemically oxidize fuel and transport electrons.

The method of manufacturing the anode supporter may further include reducing a metal oxide into the metal in the anode supporter including the metal oxide and the inorganic oxide having the oxygen ion conductivity.

The metal oxide may be reduced by using a general method publicly known in the art, and may be reduced at a temperature of specifically 550° C. or more and 950° C. or less under a reducing gas, specifically, a hydrogen gas atmosphere.

The blast method may be a sand blast method or a ceramic bead blast method.

A diameter of the sand or ceramic bead may be 0.5 millimeters or more and 10 millimeters or less. Only when the diameter is 0.5 millimeters or more, the anode supporter may be surface-treated, and only when the diameter is 10 millimeters or less, a problem of remarkably weakening strength of the anode supporter in the case where the diameter is large may be prevented.

A kind of the ceramic bead may be one or two or more selected from the group consisting of gadolinium doped ceria (GDC), gadolinium doped zirconia (GDZ), samarium doped ceria (SDC), samarium doped zirconia (SDZ), yttrium doped ceria (YDC), yttrium doped zirconia (YDZ), yttria stabilized zirconia (YSZ), and scandia stabilized zirconia (ScSZ). A shape of the ceramic bead is not limited, and for example, may be a spherical, cylindrical, conical, or irregular shape.

In the blast method, a spray speed is not particularly limited, but may be in the range of 0.1 m/sec or more and 41.6 m/sec or less. Only when the spray speed is 0.1 m/sec or more, the anode supporter may be surface-treated, and only when the spray speed is 41.6 m/sec or less, a problem of remarkably weakening strength of the anode supporter in the case where a blast speed is excessively high may be prevented.

In the blast method, a spray pressure is not particularly limited, but may be 0.5 bar or more and 5 bar or less.

The metal may be one or two or more selected from the group consisting of Zr, Ce, Ti, Mg, Al, Si, Mn, Fe, Co, Ni, Cu, Zn, Mo, Y, Nb, Sn, La, Ta, V, and Nd. Preferably, Ni may be used. Ni may have high electron conductivity and simultaneously may adsorb hydrogen and hydrocarbon-based fuel to attain high electrode catalyst activity. Further, Ni has a merit as a material for electrodes in that as compared to platinum and the like, a cost thereof is low.

The inorganic oxide having the oxygen ion conductivity may be one or two or more selected from the group consisting of gadolinium doped ceria (GDC), gadolinium doped zirconia (GDZ), samarium doped ceria (SDC), samarium doped zirconia (SDZ), yttrium doped ceria (YDC), yttrium doped zirconia (YDZ), yttria stabilized zirconia (YSZ), and scandia stabilized zirconia (ScSZ). Preferably, gadolinium doped ceria (GDC) or yttria stabilized zirconia (YSZ) may be used.

The surface-treated surface may include a concavo-convex unit having a width of 0.5 micrometers or more and 10 micrometers or less, and a height difference between a highest point and a lowest point of the concavo-convex unit may be 0.1% or more and 50% or less of the total thickness of the anode supporter. When the height difference is in the aforementioned range, an increase effect of the surface area according to surface-treating may be attained, and physical strength of the anode supporter may be maintained. The width of the concavo-convex unit may be adjusted according to the size (for example, in the case of the sphere shape, the diameter of the sphere) of the material sprayed by using the blast method. As the size of the sprayed particle is increased, the width of the concavo-convex unit tends to be increased as much, and as the size of the sprayed particle is reduced, the width of the concavo-convex unit tends to become narrow. The width and the depth of the concavo-convex unit may be measured by an optical profiler, and more precisely, may be measured by photographing a cross-section by an electron microscope (SEM).

In the present specification, the width means a distance from the lowest point of any one concave portion to the lowest point of the adjacent concave portion in the cross-section of the concavo-convex unit. In this case, the adjacent concave portions mean two concave portions while a convex portion is interposed therebetween. That is, the width of the concavo-convex unit means a straight-line distance between ridges or valleys when the concavo-convex unit is viewed from the upper surface, and the height difference between the highest point and the lowest point of the concavo-convex unit means a vertical distance from the surface including the deepest ridge to the highest point. Referring to FIG. 1, A means the width of the concavo-convex unit, and may be measured by the straight-line distance between the ridges in a top view of the concavo-convex unit formed in the anode supporter.

In the present specification, the height difference between the highest point and the lowest point of the concavo-convex unit may mean a vertical distance from the surface including the lowest point of the concavo-convex unit to the highest point of the concavo-convex unit. Referring to FIG. 1, a depth represented by B represents a vertical distance between a plane including a low point of any one concavo-convex unit at a position measured in FIG. 1 and the ridge of the concavo-convex unit having the highest point. In the entire anode supporter, the vertical distance from the surface having the lowest valley of the concavo-convex unit, that is, the surface including the lowest point of the concavo-convex unit, to the point having the highest ridge of the concavo-convex unit, that is, the highest point of the concavo-convex unit, may be the height difference between the highest point and the lowest point of the concavo-convex unit. The height difference between the highest point and the lowest point of the concavo-convex unit may mean a difference between the lowest point and the highest point of the surface-treated surface.

When the anode supporter is manufactured, in the case where blast surface-treating is performed, the surface area of the supporter may be increased by 1.5 times or more and 10 times or less as compared to the case where blast surface-treating is not performed. The surface area of the surface-treated surface may be increased by 1.5 times or more and 10 times or less as compared to the surface area before surface-treating. By increasing the surface area, there is an effect of increasing a triple phase boundary (TPB) and improving performance of the fuel cell. Further, there is an effect of preventing a delamination phenomenon of an interface.

A roughness of the surface-treated surface may be 150 nanometers or more and 900 nanometers or less. If the roughness is 150 nanometers or more, a surface-treating effect is excellent, and if the roughness is 900 nanometers or less, a problem where the fuel cell may be broken by cracks of the anode supporter while the fuel cell is operated at high temperatures may be prevented.

The roughness means a center line average roughness (Ra: arithmetical average roughness). The center line average roughness is obtained by averaging heights and depths of mountains and valleys in a reference length based on the center line, and means a distance between the center line and an average line. The center line represents, in the reference length, when an average cross-section curved line and a horizontal straight line are drawn, the straight line when areas surrounded by the straight line and the cross-section curved line are the same as each other.

The surface roughness may be measured by any method as long as the method is known in the corresponding field, and for example, may be measured by using an optical profiler.

An area specific resistance (ASR) of the surface-treated surface may be 0.01 $\Omega cm^2$ or more and 0.45 $\Omega cm^2$ or less. In this case, the area specific resistance may be measured by any method as long as the method is known in the corresponding field, and for example, may be measured by a high temperature impedance method. The area specific resistance (ARS) is an alternating current impedance property of an interface between the electrolyte and the electrode, and as this value is reduced, resistance of the interface between the electrolyte and the electrode may be reduced to attain a high fuel cell property. According to the exemplary embodiment of the present application, the area of the interface may be increased by surface-treating to increase the number of locations where a reaction is performed. Accordingly, a surface resistance (area specific resistance) may be reduced into the aforementioned range to increase performance of the fuel cell.

The thickness of the anode supporter may be generally 0.5 millimeters or more and 50 millimeters or less. More specifically, the thickness may be 1 millimeter or more and 10 millimeters or less. When the thickness is in the aforementioned range, physical strength may be maintained to attain stability of the fuel cell, and due to a low electric resistance, high performance of the fuel cell may be attained.

Among the aforementioned materials of the anode supporter, one kind may be used alone, two kinds or more may be used while being mixed, the anode supporter may be formed alone, an additional anode may be further formed on the anode supporter, and an anode having a multilayered structure may be further formed by using different anode materials. Alternatively, in the anode supporter, in order to delay densification of the anode supporter during sintering, as the metal oxide and the inorganic oxide having the oxygen ion conductivity that are starting materials, coarse particles of several micrometers or more may be used. In this case, since after sintering, the triple phase boundary (TPB) where a gas reaction occurs in the anode may not be sufficiently formed, a functional layer (FL) having the same composition as the anode supporter and the small particle size may be further included between the anode supporter and the electrolyte.

One exemplary embodiment of the present application provides an anode supporter of a solid oxide fuel cell manufactured by the aforementioned manufacturing method.

One exemplary embodiment of the present application provides a method of manufacturing a solid oxide fuel cell, the method including: preparing an anode supporter by using the aforementioned manufacturing method; and applying an inorganic oxide having ion conductivity on a surface-treated surface of the anode supporter to form an electrolyte.

The inorganic oxide included in the electrolyte may be the same as the inorganic oxide included in the anode supporter.

The electrolyte should be dense so that air and fuel are not mixed, the oxygen ion conductivity should be high, and the electron conductivity should be low. Further, in the electrolyte, the anode and the cathode having a very large oxygen partial pressure difference are positioned at both sides, and thus in a wide oxygen partial pressure region, the aforementioned physical properties need to be maintained.

The inorganic oxide included in the electrolyte is not particularly limited as long as the inorganic oxide is generally used in the corresponding technical field, and for example, may include one or two or more selected from the group consisting of zirconias doped or not doped by at least one of gadolinium, yttrium, samarium, scandium, calcium, and magnesium; cerias doped or not doped by at least one of gadolinium, samarium, lanthanum, ytterbium, and neodymium; bismuth oxides doped or not doped by at least one of calcium, strontium, barium, gadolinium, and yttrium; and lanthanum gallates doped or not doped by at least one of strontium and magnesium. More specifically, the inorganic oxide may be one or two or more selected from the group consisting of gadolinium doped ceria (GDC), gadolinium doped zirconia (GDZ), samarium doped ceria (SDC), samarium doped zirconia (SDZ), yttrium doped ceria (YDC), yttrium doped zirconia (YDZ), yttria stabilized zirconia (YSZ), and scandia stabilized zirconia (ScSZ).

The thickness of the electrolyte may be generally 10 nanometers or more and 100 micrometers or less. More specifically, the thickness may be 100 nanometers or more and 50 micrometers or less.

As a method of forming the electrolyte in the anode supporter, a typical slurry coating method including dip-coating and painting, a tape casting method, a screen printing method, a wet spray method, or a vacuum deposition method such as a chemical vapor deposition method and a physical vapor deposition method may be used.

The electrolyte may be heat-treated to be sintered. A heat-treating temperature may be 800° C. or more and 1,500° C. or less.

The method of manufacturing the solid oxide fuel cell may further include applying a cathode composition on an electrolyte to form a cathode.

The cathode of the fuel cell means a layer where an electrochemical reaction occurs in the fuel cell by an oxygen reduction catalyst. An oxygen gas is reduced into oxygen ions, and air continuously flows to the cathode to maintain a constant oxygen partial pressure.

As the oxygen reduction catalyst, for example, metal oxide particles having a perovskite type crystal structure may be used, and specifically, the oxygen reduction catalyst may be any one or a mixture of two or more selected from the group consisting of lanthanum-strontium manganese oxide (LSM), lanthanum-strontium iron oxide (LSF), lanthanum-strontium cobalt oxide (LSC), lanthanum-strontium cobalt iron oxide (LSCF), samarium-strontium cobalt oxide (SSC), barium-strontium cobalt iron oxide (BSCF), and bismuth-ruthenium oxide.

As the material forming the cathode layer, precious metals such as platinum, ruthenium, and palladium may be used. Among the aforementioned cathode materials, one kind may be used alone, two kinds or more may be used while being mixed, and a cathode having a single layer structure or a cathode having a multilayered structure using different cathode materials may be formed.

The cathode composition may further include an inorganic oxide having oxygen ion conductivity, a binder resin, and a solvent.

The binder resin is not limited as long as the binder resin may provide adhesion strength, and for example, may be ethyl cellulose.

The solvent is not limited as long as the solvent may dissolve the binder resin, and may be any one kind or two kinds or more selected from the group consisting of butyl carbitol, terpineol, and butyl carbitol acetate.

The cathode composition may be heat-treated to be sintered. A heat-treating temperature may be 800° C. or more and 1,200° C. or less. At 800° C. or more, the oxygen reduction catalyst may be sintered together with the inorganic oxide, and at 1,200° C. or less, the oxygen reduction catalyst may be sintered while not being reacted with the electrolyte.

The thickness of the cathode may be generally 1 micrometer or more and 100 micrometers or less. More specifically, the thickness may be 5 micrometers or more and 50 micrometers or less.

As a method of forming the cathode in the electrolyte, a tape casting method, a screen printing method, or a wet spray method may be used.

Between the cathode and the electrolyte, if necessary, in order to more effectively prevent a reaction therebetween, a functional layer may be further included. As this functional layer, for example, one or two or more selected from the group consisting of gadolinium doped ceria (GDC), samarium doped ceria (SDC), and yttrium doped ceria (YDC) may be included. The thickness of the functional layer may be in the range of 1 micrometer or more and 50 micrometers or less, and for example, 2 micrometers or more and 10 micrometers or less.

One exemplary embodiment of the present application provides an anode supporter of a solid oxide fuel cell including: a metal, and an inorganic oxide having oxygen ion conductivity, in which a concavo-convex unit having a width of 0.5 micrometers or more and 10 micrometers or less is provided on at least one surface of the anode supporter, and a height difference between a highest point and a lowest point of the concavo-convex unit is 0.1% or more and 50% or less of a total thickness of the anode supporter.

A roughness of the surface of the anode supporter having the concavo-convex unit may be 150 nanometers or more and 900 nanometers or less.

An area specific resistance (ASR) of the surface of the anode supporter having the concavo-convex unit may be 0.01 $\Omega cm^2$ or more and 0.45 $\Omega cm^2$ or less.

The surface of the anode supporter having the concavo-convex unit is a portion coming into contact with the electrolyte.

A description of the metal, the inorganic oxide, the concavo-convex unit, the roughness, and the area specific resistance is the same as that described in the above.

One exemplary embodiment of the present application provides a method of manufacturing a solid oxide fuel cell, the method including: preparing the aforementioned anode supporter; and applying an inorganic oxide having ion conductivity on a surface-treated surface of the anode supporter to form an electrolyte.

One exemplary embodiment of the present application provides a solid oxide fuel cell including: an anode supporter; a cathode positioned to face the anode supporter; and an electrolyte positioned between the anode supporter and the cathode.

The solid oxide fuel cell may be manufactured by using a general method publicly known in various kinds of documents in the corresponding technical field. Further, the solid oxide fuel cell may be applied to various structures such as a tubular stack, a flat tubular stack, and a planar type stack.

Hereinafter, the present application will be specifically described with reference to Examples and Comparative Examples. However, the Examples according to the present application may be modified in various other forms, and the scope of the present application is not interpreted to be limited to the Examples as will be described in detail below. The Examples of the present application are provided to more fully describe the present application to the person with ordinary skill in the art.

Example 1

The anode supporter having the thickness of 3 millimeters while the volume ratio of GDC (10 mole % Gd doped Ceria) was manufactured by the uniaxial pressing method and NiO was 50:50, and sintered at the temperature of 1450° C. Thereafter, at the temperature of 850° C., NiO/GDC were reduced into Ni/GDC by using the reduction gas ($H_2$) for 30 minutes.

One surface of the Ni/GDC anode supporter was treated with the sand having the diameter of 0.5 millimeters at the speed of 40 m/sec under the pressure of 5 bar for 10 minutes by using the blast method.

The concavo-convex unit having the width of 1 micrometer was formed on the surface treated by the blast method, and the height difference between the highest point and the lowest point of the concavo-convex unit was 20 micrometers. In this case, the roughness of the surface was 300 nanometers when measured by using the optical profiler. The area specific resistance of the surface was 0.3 $\Omega cm^2$ when measured by the alternating current impedance method.

Data obtained by measuring the surface roughness of the anode supporter of Example 1 by using the optical profiler are illustrated in FIG. 3.

FIG. 3 is a top view obtained by measuring the anode supporter including the concavo-convex unit by the optical profiler. It can be confirmed that as the color is close to the red, the valley of the concavo-convex unit becomes deep, and it can be seen that as the color is close to the blue, the ridge of the concavo-convex unit becomes high. The site having the blue color close to the value of 0 means the lowest site among the measured sites, that is, the lowest point of the concavo-convex unit. For example, it can be seen that portion a represented in FIG. 3 has the blue color and has the low position of the surface of the anode supporter, portion c has the red color and has the high position of the surface of the anode supporter, and portion b has the intermediate position of the surface of the anode supporter. According to a change in color illustrated in FIG. 3, the presence of the concavo-convex unit can be confirmed, the width and the depth of the concavo-convex unit can be approximately measured, and the roughness measured by the optical profiler can be confirmed.

In FIG. 3, Ra means the center line average roughness, and Rq means a square mean roughness and may be obtained by using the root mean square (rms) method. Further, Rt means the distance between the highest point and the lowest point of the profile in the average length Lm (evaluation length). In addition, Rz is the ten point median height and means the difference between the average height of five highest mountains and the average depth of the deepest valleys in the cross-section curved line.

The cross-sectional view of the form where the electrolyte was applied on the surface-treated surface of the anode supporter of Example 1 was photographed by the electron microscope (SEM), and is illustrated in FIG. 1. In the graph of FIG. 1, the present of the concavo-convex unit can be confirmed, and the width A and the depth B of the concavo-convex unit can be specifically measured.

The width of the concavo-convex unit according to the exemplary embodiment of the present application means a straight-line distance between ridges or valleys when the concavo-convex unit is viewed from the upper surface, and the height difference between the highest point and the lowest point of the concavo-convex unit means a vertical distance from the surface including the deepest ridge to the highest point. Referring to FIG. 1, A means the width of the concavo-convex unit, and may be measured by the straight-line distance between the ridges in a top view of the concavo-convex unit formed in the anode supporter. Further, a depth represented by B represents a vertical distance between a plane including a low point of any one concavo-convex unit at a position measured in FIG. 1 and the ridge of the concavo-convex unit having the highest point.

Example 2

One surface of the Ni/GDC anode supporter manufactured in Example 1 was treated with the ceria bead having the diameter of 1 millimeter at the speed of 40 m/sec under the pressure of 5 bar for 10 minutes by using the blast method.

The concavo-convex unit having the width of 0.5 micrometers was formed on the surface treated by the blast method, and the height difference between the highest point and the lowest point of the concavo-convex unit was 20 micrometers. In this case, the roughness of the surface was 500 nanometers when measured by using the optical profiler, and the area specific resistance of the surface was 0.3 $\Omega cm^2$ when measured by the alternating current impedance method.

Comparative Example 1

In the case where the Ni/GDC anode supporter manufactured in Example 1 was not surface-treated by using the blast method, the concavo-convex unit was not present on the surface, the surface roughness was 100 nanometers, and the area specific resistance was 0.5 $\Omega cm^2$.

The cross-sectional view of the form where the electrolyte was applied on the anode supporter of Comparative Example 1 was photographed by the electron microscope (SEM), and is illustrated in FIG. 2.

Preparation Example 1

On the surface of the anode supporter manufactured in Example 1, which was treated by the blast method, GDC was applied in the thickness of 10 micrometers by the dip coating method, followed by sintering at the temperature of 1450° C. to form the electrolyte. On the electrolyte, LSCF was applied in the thickness of 30 micrometers by the screen printing method, followed by sintering at the temperature of 1000° C. to form the cathode layer and thus manufacture the fuel cell.

Preparation Example 2

The fuel cell was manufactured by using the anode supporter of Example 2 by the same method as Preparation Example 1.

Preparation Example 3

The fuel cell was manufactured by using the anode supporter of Comparative Example 1 by the same method as Preparation Example 1.

Although the exemplary embodiments of the present application are described with reference to the accompanying drawings, the present application is not limited to the exemplary embodiments but may be manufactured in various different forms, and it will be appreciated by those skilled in the art that various modifications and changes may be performed in other specific forms without departing from the technical spirit or essential feature of the application. Therefore, it should be understood that the above exemplary embodiments are illustrative in all aspects but are not limitative.

The invention claimed is:

1. A method of manufacturing an anode supporter and electrolyte of a solid oxide fuel cell, the method comprising:
   surface-treating at least one sintered surface of the anode supporter including a metal and an inorganic oxide having oxygen ion conductivity by using a ceramic bead blast method until the at least one sintered surface has an Ra of from −1AQ-500 to 900 nanometers and a surface area of the at least one sintered surface is increased by 1.5 times or more and 10 times or less: and
   applying an inorganic oxide having ion conductivity on the treated surface of the anode supporter to form an electrolyte,
   wherein the ceramic beads are chosen from gadolinium doped ceria (GDC), gadolinium doped zirconia (GDZ), samarium doped ceria (SDC), samarium doped zirconia (SDZ), yttrium doped ceria (YDC), yttrium doped zirconia (YDZ), yttria stabilized zirconia (YSZ), and scandia stabilized zirconia (ScSZ).

2. The method of claim 1, wherein a diameter of the ceramic bead is 0.5 millimeters or more and 10 millimeters or less.

3. The method of claim 1, wherein in the blast method, a spray speed is 0.1 m/sec or more and 41.6 m/sec or less.

4. The method of claim 1, wherein in the blast method, a spray pressure is 0.5 bar or more and 5 bar or less.

5. The method of claim 1, wherein the metal is one or two or more selected from the group consisting of Zr, Ce, Ti, Mg, Al, Si, Mn, Fe, Co, Ni, Cu, Zn, Mo, Y, Nb, Sn, La, Ta, V, and Nd.

6. The method of claim 1, wherein the inorganic oxide having the oxygen ion conductivity is one or two or more selected from the group consisting of gadolinium doped ceria (GDC), gadolinium doped zirconia (GDZ), samarium doped ceria (SDC), samarium doped zirconia (SDZ), yttrium doped ceria (YDC), yttrium doped zirconia (YDZ), yttria stabilized zirconia (YSZ), and scandia stabilized zirconia (ScSZ).

7. The method of claim 1, wherein the surface-treated surface includes a concavo-convex unit having a width of 0.5 micrometers or more and 10 micrometers or less, and a height difference between a highest point and a lowest point of the concavo-convex unit is 0.1% or more and 50% or less of a total thickness of the anode supporter.

8. The method of claim 1, wherein the inorganic oxide included in the electrolyte is the same as the inorganic oxide included in the anode supporter.

* * * * *